No. 757,732. PATENTED APR. 19, 1904.
T. W. FITCH, Jr.
COAL TIPPLE STRUCTURE.
APPLICATION FILED JAN. 28, 1904.
NO MODEL. 3 SHEETS—SHEET 1.
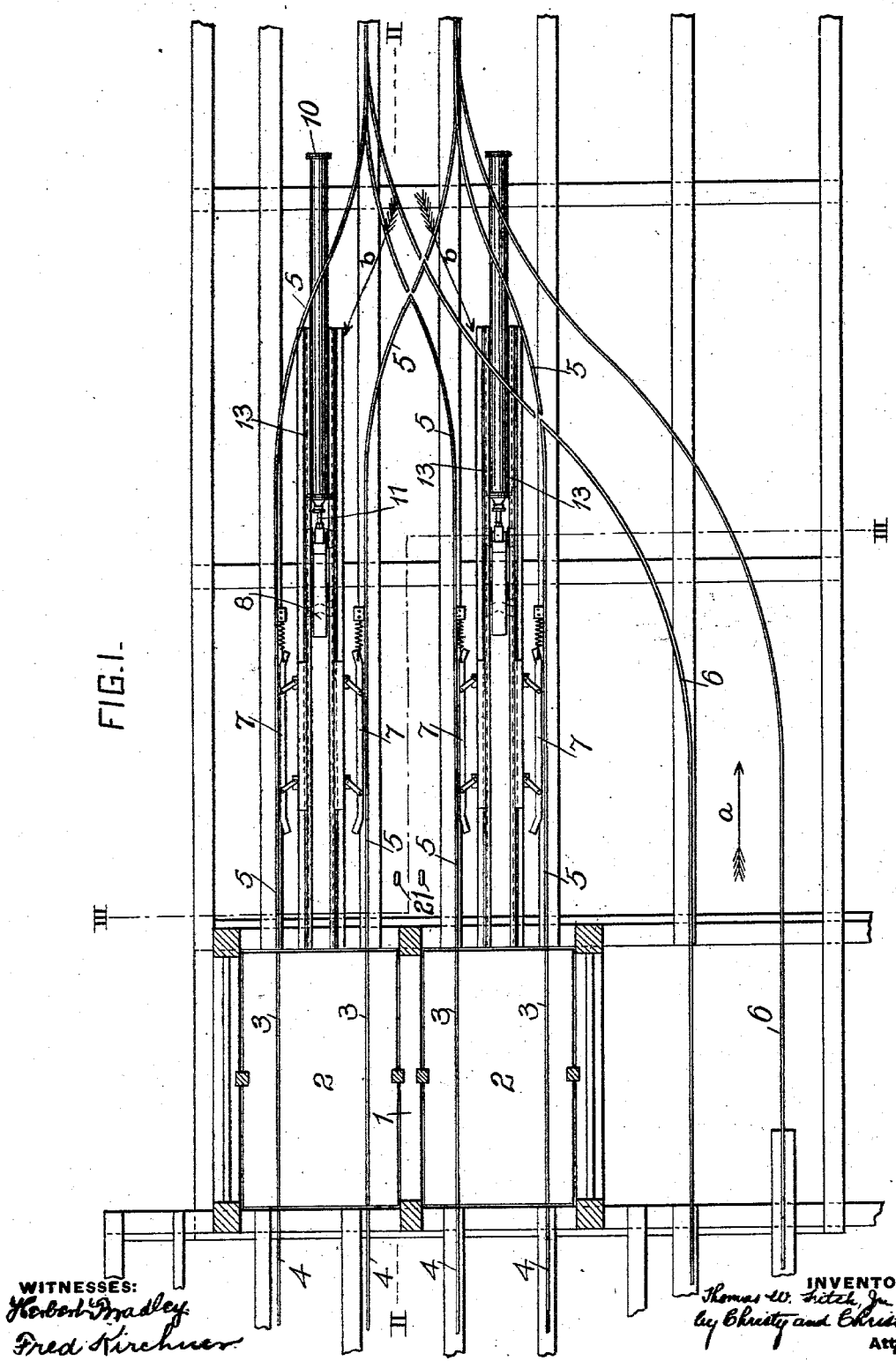

No. 757,732. PATENTED APR. 19, 1904.
T. W. FITCH, Jr.
COAL TIPPLE STRUCTURE.
APPLICATION FILED JAN. 28, 1904.
NO MODEL. 3 SHEETS—SHEET 2.
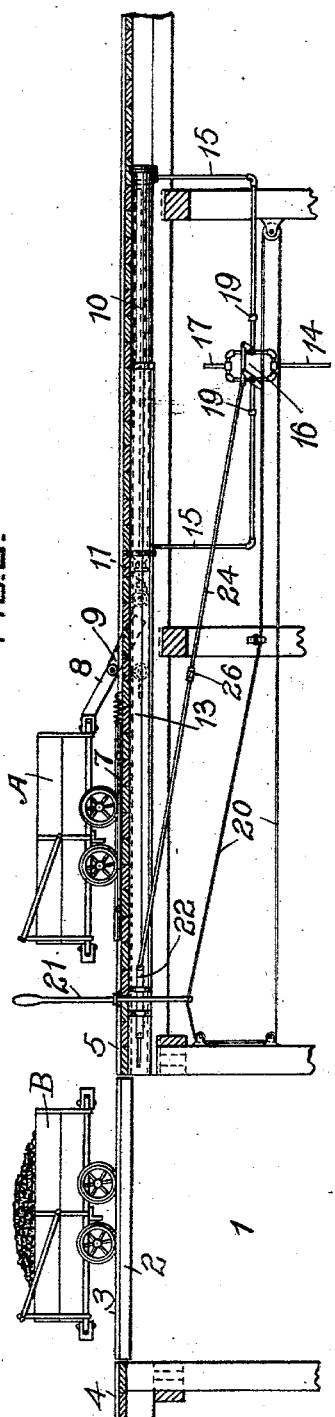
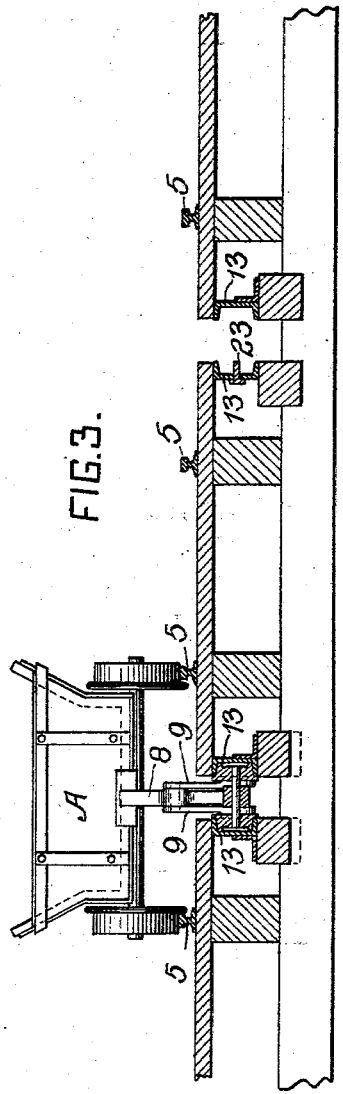
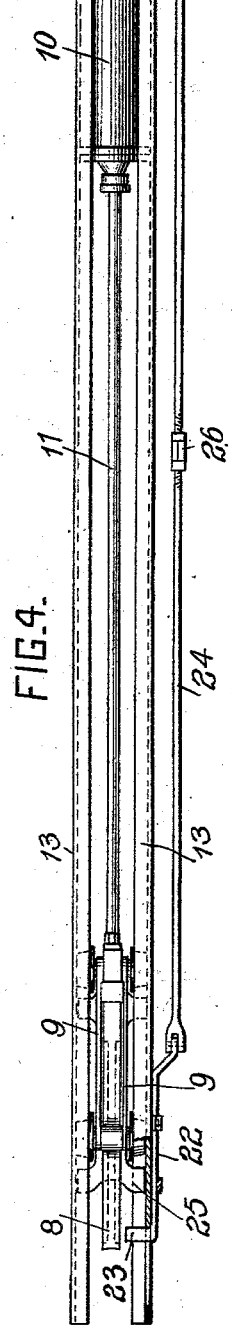
WITNESSES:
Herbert Bradley.
Fred Kirchner.
INVENTOR
Thomas W. Fitch, Jr.
by Christy and Christy
Att'ys No. 757,732. PATENTED APR. 19, 1904.
T. W. FITCH, Jr.
COAL TIPPLE STRUCTURE.
APPLICATION FILED JAN. 28, 1904.
NO MODEL. 3 SHEETS—SHEET 3.
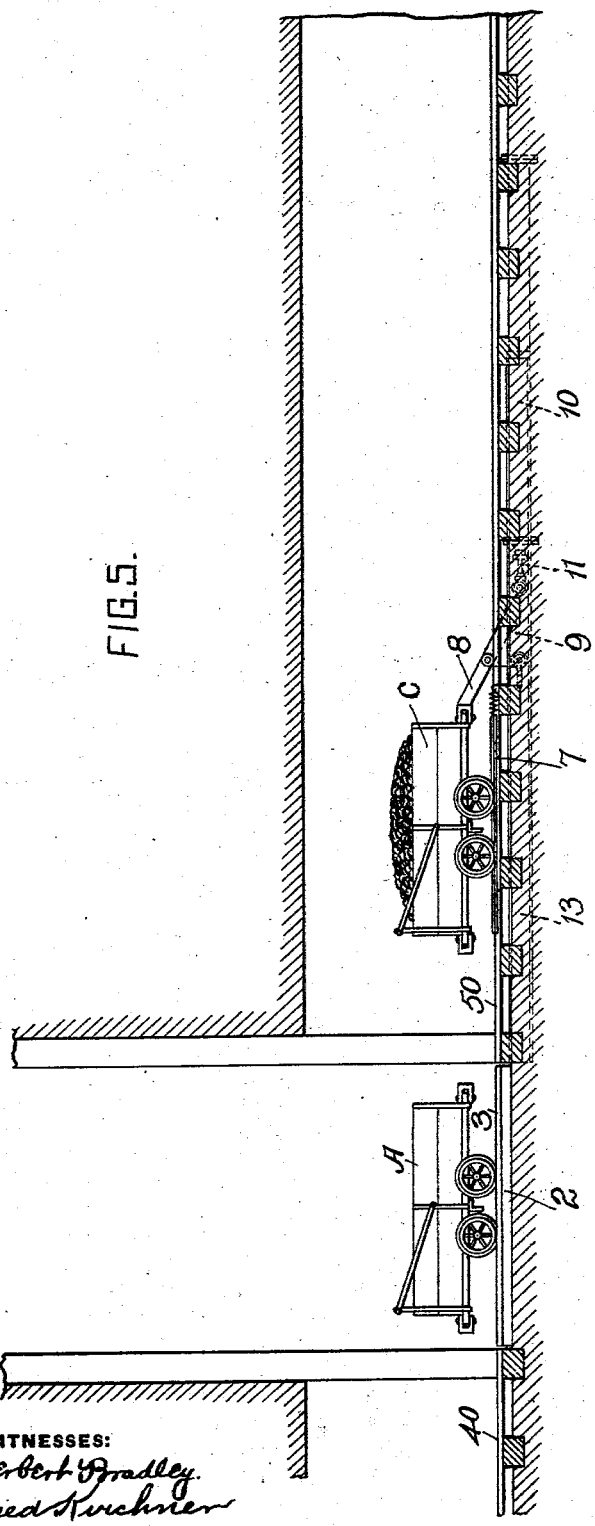
WITNESSES:
Herbert Bradley.
Fred Kirchner
INVENTOR
Thomas W. Fitch, Jr.
by Christy and Christy,
Atty's.

No. 757,732. Patented April 19, 1904.

UNITED STATES PATENT OFFICE.

THOMAS W. FITCH, JR., OF SEWICKLEY, PENNSYLVANIA.

COAL-TIPPLE STRUCTURE.

SPECIFICATION forming part of Letters Patent No. 757,732, dated April 19, 1904.

Application filed January 28, 1904. Serial No. 191,056. (No model.)

*To all whom it may concern:*

Be it known that I, THOMAS W. FITCH, Jr., a citizen of the United States, residing at Sewickley, in the county of Allegheny and State of Pennsylvania, have invented or discovered a certain new and useful Improvement in Coal-Tipple Structures, of which improvement the following is a specification.

My improvement concerns coal-mine structures; and the object of my invention is the automatic shifting of the cars to and from the cages of the mine-shaft in a more expeditious and satisfactory manner than has heretofore been done.

In the accompanying drawings, which form part of this specification, Figure 1 is a plan view of a portion of a coal-mine structure embodying my invention. Fig. 2 is a longitudinal section of the structure illustrated in Fig. 1, the line of section being indicated at II II, Fig. 1. In Fig. 2 cars are shown in operative positions, as will hereinafter be described. Fig. 3 is a view in transverse section on the line III III, Fig. 1. Fig. 4 is a plan view, on larger scale, of a portion of the structure shown in Fig. 1; and Fig. 5 is a view in longitudinal section of the approaches from the mine to the shaft.

Parts which are illustrated in more than one of the figures bear the same reference characters in each case.

Referring to the drawings, a mine-shaft is shown at 1, and in it are placed cages 2. These cages as they are ordinarily employed are arranged in pairs, as Fig. 1 indicates, and each pair of cages is so arranged that when one cage is at the top of the shaft the other is at the bottom. Thus the ascending cage raises a loaded car for delivery, while the descending cage carries an empty car to be filled in the mine. The cages are provided with tracks 3, upon which the cars are conveyed to and from the cages. The tracks 3 register at either end when the cages are in elevated position with tracks 4, leading to the tipple, (or place of discharge of the loads,) and with tracks 5, upon which the empty cars approach after discharging their load. When the cages are in the lowered position, (shown in Fig. 5,) their tracks 3 register with other tracks 40 and 50, upon which the cars travel in the mine. It is unnecessary to my present invention to describe in detail the tipple and mine and means of shifting the cars to the places for loading and unloading and from one side of the shaft to the other.

Directing attention first to the tracks above ground, Fig. 1 illustrates tracks 6, which constitute a return line from one side of the shaft to the other, the direction of the movement of the cars being indicated by the arrow $a$. From the return-track the cars are switched to the tracks 5, and over these they pass to the cages. As ordinarily arranged the empty cars approach the cages on tracks 5 in the direction indicated by arrows $b$, impelled by gravity. The cars are brought to rest upon tracks 5 in proper position to be carried to the cages by my improved mechanism. A convenient means of stopping the cars at the desired point is by track-brakes, (illustrated at 7.) These track-brakes form no part of my present invention. They are all well known in the art and are accordingly not here described in detail.

Referring to Fig. 5, an empty car A is shown resting upon cage-tracks 3, it having been brought down the shaft from the tipple where it has discharged its load. A loaded car C is shown resting on tracks 50. These cars are in position ready to be shifted—the empty car from the cage and the loaded car upon the cage. It will be understood that the empty car when carried upon tracks 40 will travel by suitable arrangement to the point where the mine is being worked and when loaded will again be brought to the cage over tracks 50.

My improvement consists in means for shifting the cars from the tracks to the cages and from the cages to the tracks. These means I will now describe.

The component parts of my apparatus are a swinging dog 8, carried by a truck or carrier 9, a fluid-pressure cylinder 10, hydraulic, pneumatic, or steam actuated, provided with a piston 11 and means for operating the piston such as I shall presently describe. The truck or carrier 9 which carries the dog 8 is arranged to move adjacent to and in a direction parallel with the car in traveling from the tracks to the cage. The dog 8 is arranged to swing aside to allow a car approaching the cage to pass and as the car passes to swing again to normal position, engage the car from the rear, and serve as a pusher in impelling the car to the cage. In Figs. 2 and 3 an empty car A is illustrated in position ready to be impelled by the swinging dog 8 to the cage-tracks 3, while a loaded car B is shown standing upon the cage-tracks ready to be impelled upon tracks 4, which lead to the tipple. In Fig. 5 a loaded car C is shown in position ready to be impelled by the swinging dog 8 to the cage-tracks 3, while an empty car A stands upon the cage-tracks ready for delivery to tracks 40, whence it passes to the mine.

My preferred construction in this particular is illustrated in the drawings. Between each pair of tracks, over which the cars approach the cages, tracks 13 are arranged. Each pair of tracks 13 carries a truck 9, and dog 8 is arranged to swing in vertical plane and to return to normal position by gravity. These parts are so arranged as not to impede the cars passing upon the tracks. The dog 8 only engages the car, and this swinging aside allows the car to pass and immediately resumes normal position, ready to engage the end sill or other suitable surface on the car, and thereby to push the car forward to the cage. Truck 9 is mounted upon or connected to the piston 11 of the fluid-pressure cylinder 10. These parts also may conveniently be arranged between the tracks and sunken so that they do not interfere with the movement of the cars. Fluid pressure is admitted to the cylinder upon either side of the piston from a supply-pipe 14 through connecting-pipes 15, and a valve-structure 16 is so arranged that as the valves are shifted each end of the cylinder in turn receives fluid-pressure from supply-pipe 14, while the other end is opened through its connecting-pipe with an exhaust 17. Pressure-controlling valves 19 may be placed in the connecting-pipes 15, if desired. The valve structure 16 is so arranged that it may be oprated manually and automatically as well. The arrangement for manual operation preferably consists of an endless rope 20, secured to the valves, passing over suitably-arranged sheaves, and secured also at a suitable point to a lever 21, capable of being shifted and when shifted causing the endless rope to move longitudinally to shift the valves. The valves are operated automatically also by means of the following mechanism: Adjacent to track 13 is a trigger 22, adapted to be shifted in its bearings and provided with an arm 23, which extends into the path of the truck 9. This trigger 22 is connected through a rod 24 with the valves 16. Preferably the trigger 22 is arranged, as shown, to move longitudinally upon the outer side of track 13. The arm 23 projects through a slot in track 13, and a suitably-arranged surface 25 is formed upon the truck to engage this arm. A turnbuckle 26 is placed in connecting-rod 24, and thereby the position of arm 23 may be adjusted to engage truck 9 at the exact point desired. In Fig. 5 I have not illustrated the means for operating the piston. It will be understood that this differs in no respect from the means shown in Figs. 2 and 4 and that it may be located as is found convenient.

The operation of the parts is as follows: The car A, Fig. 2, having discharged its load, has been brought to the side of the shaft opposite the tipple and passes down tracks 5 in the direction of arrow $b$. As it passes over truck 9 the swinging dog is depressed, and as the car passes on it rises again to normal position. Meanwhile the track-brake 7 brings car A to rest in front of truck 9 and in position ready to be carried forward upon cage-tracks 3. Meantime the cage 2 has elevated a loaded car B, which stands ready to pass to the tipple. The fluid-pressure cylinder has during this operation remained quiescent, its piston withdrawn, its posterior end open to the exhaust, and its anterior end open to the pressure-supply. The truck 9 has also been in retracted position. The operator then shifts lever 21. He thereby shifts the valves, opening the rear end of the cylinder to the impelling-pressure and the forward end to the exhaust. The piston then advances, carrying truck 9 forward, and dog 8, meantime engaging car A, carries it forward from tracks 5 to tracks 3 upon the cage. At the same time the loaded car B, resting on tracks 3 of the same cage, is driven forward (impelled by car A) upon tracks 4, over which it passes to the tipple. When the hydraulic cylinder has impelled the car or cars the proper distance, a suitable adjustment of parts brings shoulder 25 into engagement with arm 23 of trigger 22, moving that trigger forward, thereby shifting the valves, reversing the movement of the piston in the cylinder, causing the latter to be retracted, and allowing the truck also to retreat until the parts are in the position indicated in Fig. 2, ready to permit another car to pass over them and to engage and impel another car to the cage. The empty car A thus conveyed to the cage is carried to the bottom of the shaft to the position shown in Fig. 5. There another loaded car C, having approached upon tracks 50 and passed over truck 9 and dog 8, stands ready to take the place of car A on the cage. Operation of piston 11 and the other parts of the impelling mechanism in the manner already described brings car C upon the cage and carries car A to tracks 40, leading to the loading-place.

I claim as my invention—

1. In a coal-mine structure, the combination of a cage, tracks leading thereto, a truck movable in a direction parallel to that of a car upon the tracks and carrying a dog adapted to allow a car to pass along the track toward the cage but to abut against a car which has passed it in moving toward the cage and to impart a propelling force to the car, a fluid-pressure cylinder provided with a piston which imparts movement to the truck, and means for automatically reversing the piston when it shall have made a certain predetermined traverse, substantially as described.

2. In a coal-tipple structure, the combination with a cage, a car-track leading to the cage, a pusher for impelling cars from the track to the cage, and a fluid-pressure motor for impelling the pusher, of an adjustable trigger operated by the pusher and by its operation reversing the fluid-pressure motor, substantially as described.

3. In a coal-mine structure, the combination of a cage, tracks leading thereto, a carrier movable in a direction parallel to that of a car upon the tracks and carrying a dog adapted to allow a car to pass along the track toward the cage but to abut against a car which has passed it in moving toward the cage and to impart an impelling force to the car, and a fluid-pressure cylinder provided with a piston which by its movement imparts movement to the carrier, substantially as described.

In testimony whereof I have hereunto set my hand.

THOMAS W. FITCH, Jr.

Witnesses:
F. E. GAITHER,
BAYARD H. CHRISTY.